United States Patent [19]

Haw

[11] Patent Number: 5,129,183
[45] Date of Patent: Jul. 14, 1992

[54] SELF-WATERING FLOWERPOT

[76] Inventor: Sun W. Haw, 4th Fl.-1, No. 5, Alley 3, Lane 20, Chienkwo Yi Rd., Kaohsiung, Taiwan

[21] Appl. No.: 751,103

[22] Filed: Aug. 28, 1991

[51] Int. Cl.⁵ .............................................. A01G 27/00
[52] U.S. Cl. ........................................................ 47/81
[58] Field of Search ............................................. 47/81

[56] References Cited

U.S. PATENT DOCUMENTS

| | | | |
|---|---|---|---|
| 2,691,245 | 10/1954 | Yohe | 47/81 |
| 3,871,131 | 3/1975 | Berglund | 47/81 |
| 4,165,835 | 8/1979 | Dearling | 47/81 |

FOREIGN PATENT DOCUMENTS

| | | | |
|---|---|---|---|
| 1062054 | 7/1959 | Fed. Rep. of Germany | 47/81 |
| 2149072 | 4/1973 | Fed. Rep. of Germany | 47/81 |
| 1598198 | 9/1981 | United Kingdom | 47/81 |

*Primary Examiner*—David A. Scherbel
*Assistant Examiner*—Joanne C. Downs
*Attorney, Agent, or Firm*—Morton J. Rosenberg; David I. Klein

[57] ABSTRACT

A self-watering flowerpot has two chambers: an upper one for accommodating soil and a plant and a lower one for accommodating water. The upper chamber has a downwardly protruding tubular neck and threading around a lower outside periphery thereof. The lower chamber has an upwardly protruding tubular drain and threading around an upper inside periphery thereof. A tubular conduit element made of porous material is positioned between an outside periphery of the drain and inside periphery of the neck when the upper and lower chambers are threaded together. The two chambers are rotatable relative to each other so as to control the flow of water from the lower chamber to the upper chamber via the conduit element. An inlet pipe allows water to be filled into the lower chamber.

6 Claims, 2 Drawing Sheets

SELF-WATERING FLOWERPOT

BACKGROUND OF THE INVENTION

1. Field of the Invention

The present invention relates generally to plant husbandry and, more particularly, to devices for supporting flora. Specifically, the present invention relates to a container for supporting flora that is self-watering.

2. Description of Related Art

Numerous designs for flowerpots have been developed which employ a structure for allowing a flowerpot to be self-watering, Such designs include U.S. pat. Nos. 661,411; 1,133,735; 2.072,185; 2,605,588; 2,638,716; 2,713,753; 4,829,709; and 4,858,381; Norwegian Patent No. 109,632; U.K. Patent No. 2,095,083; and Swiss Patent No. 291,411.

These designs arose from the need to provide a flowerpot with some type of self-watering means in order to eliminate the inconvenience of frequent manual watering. Many provide a reservoir for accommodating a supply of water and a wick element for conducting the water to the soil and plant.

However, many of the designs are unnecessarily complicated. Others do not have a means for controlling the amount of water being conducted to the soil and plant. Still others have bulky designs which are in want of esthetic appeal. Therefore, there has been an unfulfilled need in the related art for a self-watering flowerpot which is relatively simple in design and construction, and which employs an easily-used means for controlling a flow of water to the soil and plant.

SUMMARY OF THE INVENTION

The present invention provides a self-watering flowerpot having an upper terra chamber and a lower aqua chamber threadingly engaged. The terra chamber accommodates soil and flora and has an downwardly protruding tubular neck. THe aqua chamber accommodates a supply of water and has an upwardly protruding drain which is receivable within the neck of the terra chamber. A conduit means is sandwiched between the neck and the drain, communicating with the water in the aqua chamber and the soil in the terra chamber, conducting water therebetween. The conduit means is made of porous, semipermeable material. An inlet pipe allows water to be filled into the aqua chamber from an outside of the flowerpot.

When assembled and filled with soil, flora, and water, the terra chamber and the aqua chamber are rotatable with respect to each other. This rotation allows the conduit means to be turned "OFF" and "ON": the conduit means has a lower portion sandwiched between a bottom of the neck and a bottom surface of the aqua chamber, such that when the terra chamber is rotated clockwise (i.e., tightened) with respect to the aqua chamber, the conduit means will be pinched therebetween, either retarding the passage of water or stopping it completely.

Advantages and features of novelty which characterize the invention are pointed out with particularity in the claims annexed hereto and forming a part hereof. However, for a better understanding of the invention, reference should be made to the accompanying drawings in relation to the detailed description hereunder.

DETAILED DESCRIPTION OF THE PREFERRED EMBODIMENT

Figure 1:
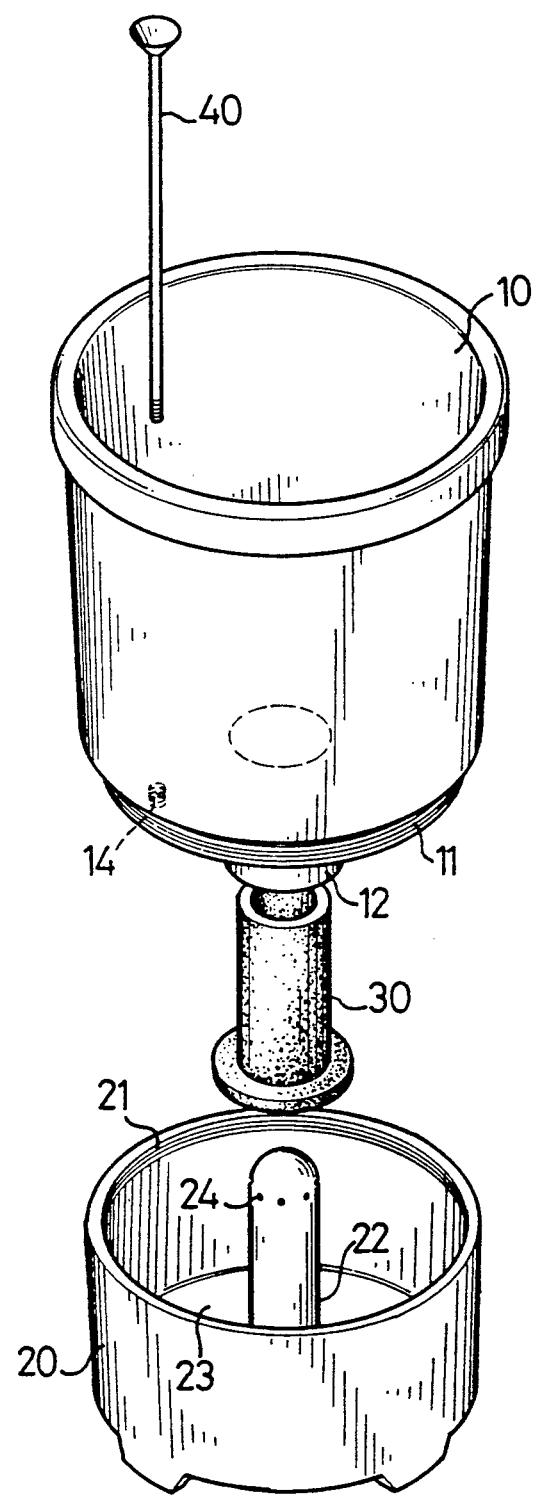
FIG. 1 is an exploded view of a self-watering flowerpot shown in a preferred embodiment in accordance with the present invention.

Now referring to the drawings, particularly to FIG. 1, a self-watering flowerpot shown in a preferred embodiment in accordance with the present invention generally comprises: (1) an upper terra chamber 10 being substantially cup-shaped and comprising threading 11 formed around a lower outside periphery thereof, a cylindrical neck 12 with a bottom rim 13 (see FIG. 3) protruding downward from a central bottom surface thereof, and a threaded through hole 14 formed in the bottom surface thereof; (2) a lower aqua chamber 20 being substantially cup-shaped and comprising threading 21 formed around an upper inside periphery thereof, a drain 22 protruding upward from a bottom surface 23 thereof, a plurality of apertures 24 formed in a top portion of the drain 22; (3) a tubular conduit means 30 being made of a porous and semipermeable material; and (4) an inlet pipe 40 having a funnel on a top end thereof and threading on a bottom end thereof.

Figure 2:
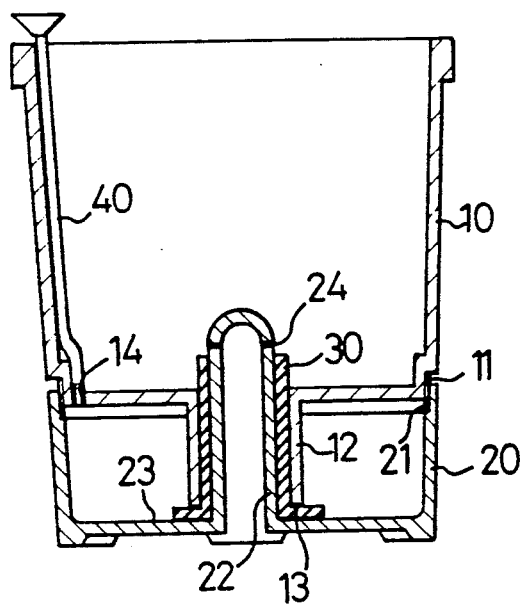
FIG. 2 is a cross-sectional view of the self-watering flowerpot shown in an "ON" situation.

The self-watering flowerpot is shown assembled in FIG. 2. The terra chamber 10 is received by the aqua chamber 20, with the drain 22 inserted up through the neck 12, the threading 11 of the terra chamber 10 engaged with the threading 21 of the aqua chamber 20, and the conduit means 30 positioned between an outer periphery of the drain 22 and an inside periphery of the neck 12. As can be seen, the conduit means has a bottom annular portion in the shape of a flange which is sandwiched between the bottom portion 13 of the neck 12 and the bottom surface 23 of the aqua chamber. Also, the conduit means 30 extends substantially upward into the terra chamber, ending slightly below the plurality of apertures 24. The inlet pipe 40 is threaded into the through hole 14, which communicates with the aqua chamber 20, and is positioned flush against an inside periphery of the terra chamber 10, with the funnel thereof extending beyond the top of the terra chamber 10. The inlet pipe 40 has a slight kink in a lower portion thereof to accommodate for a recess of the terra chamber 10.

Figure 3:
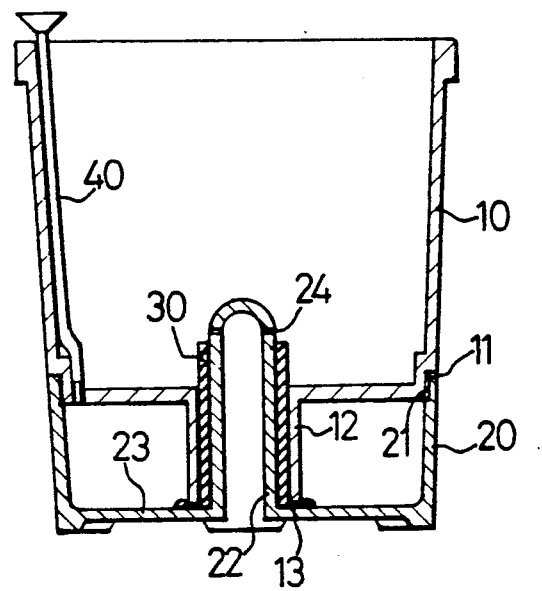
FIG. 3 is a cross-sectional view of the self-watering flowerpot shown in an "OFF" situation.
Figure 4:
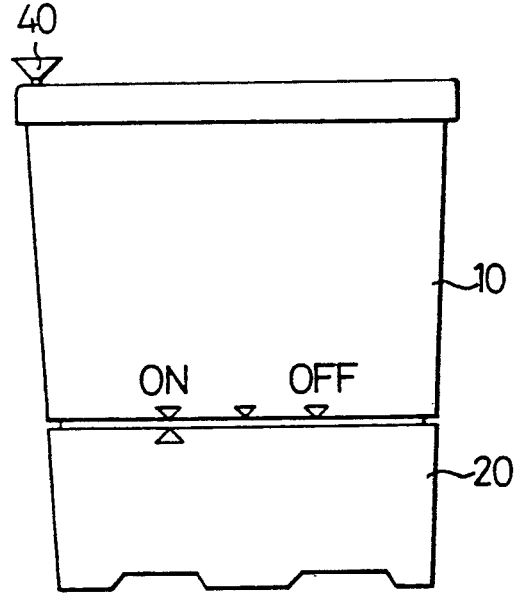
FIG. 4 is a plan view of the self-watering flowerpot, showing indicators inscribed thereon indicating the "ON" situation.

With continual reference to FIG. 2 and additional reference to FIGS. 3 and 4, the operation of the self-watering flowerpot will follow. When soil and a plant have been potted in the terra chamber 10 and when water has been filled in the aqua chamber 20 via the inlet pipe 40, watering of the plant can take place by the position shown in FIG. 2. The conduit means 30 is in an unpinched or non-deformed condition between the bottom portion 13 of the neck 12 and the bottom surface 23 of the aqua chamber (a gap can be seen at the intersection of outside peripheries of the terra and aqua chambers 10 and 20). Water is absorbed into the conduit means 30 and conducted upward to the soil to be absorbed thereby and subsequently by the plant. This situation is indicated in FIG. 4 by an alignment of indicators marking an "ON" situation.

If it is desired to have an "OFF" situation, i.e., no upward flow of water, the terra chamber 10 is rotated clockwise with respect to the aqua chamber 20 until the two chambers 10 and 20 are tightened together, as shown in FIG. 3. This situation renders the conduit means 30 pinched between the bottom portion 13 of the neck 12 and the bottom surface 23 of the aqua chamber 20, thereby preventing the flow or absorption of water into the conduit means 30.

If desired, any intermediate position may be obtained between the two above-described extremes. The conduit means 30 may be partially pinched to lessen the porosity thereof to retard the flow or absorption of water thereinto, thereby watering the plant at a slower rate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims, are expressed.

I claim:

1. A device for supporting flora comprising a terra chamber for accommodating soil and flora, an aqua chamber for accommodating a supply of water, engaging means for engaging said terra chamber to said aqua chamber, and conducting means for conducting water from said aqua chamber to said terra chamber; said conducting means comprising an inner pipe protruding downward from a bottom of said terra chamber, an outer pipe protruding upward from a bottom surface of said aqua chamber, and absorbing means for absorbing water; said inner pipe being receivable within said outer pipe; said absorbing means being positionable between said outer pipe and said inner pipe and extending from said aqua chamber into said terra chamber; said engaging means being adjustable, so that said terra chamber is positionable on said aqua chamber.

2. A device for supporting flora as claimed in claim 1, wherein said absorbing means is tubular and comprises an annular flange integrally formed around a bottom periphery thereof, said flange being positioned between a bottom of said outer pipe and said bottom of said aqua chamber; and wherein said engaging means allows said terra chamber to be positionable with respect to said aqua chamber between an "ON" position, where said terra chamber is extended from said aqua chamber, allowing said absorbing means to absorb water; and an "OFF" position, where said terra chamber is tightened on said aqua chamber, thereby pinching said absorbing means between said bottom of said outer pipe and said bottom of said aqua chamber, preventing said absorbing means from absorbing water.

3. A device for supporting flora as claimed in claim 2, wherein said engaging means allows said terra chamber to be positionable with respect to said aqua chamber gradiently between said "ON" position and said "OFF" position, thereby retarding said absorbing means in absorbing water.

4. A device for supporting flora as claimed in claim 3, wherein said engaging means comprises threading formed in a lower outside periphery of said terra chamber and threading formed in an upper inside periphery of said aqua chamber.

5. A device for supporting flora as claimed in claim 1, wherein said absorbing means is tubular and said outer pipe has an inner diameter greater than an outer diameter of said inner pipe; said absorbing means has an outer diameter less than said inner diameter of said outer pipe and an inner diameter greater than said outer diameter of said inner pipe; said absorbing means is sandwiched between said outer pipe and said inner pipe and extends from said aqua chamber into said terra chamber.

6. A device for supporting flora as claimed in claim 1, wherein said inner pipe is closed at a top thereof and open to an outside of said aqua chamber at a bottom thereof, said inner pipe comprising a plurality of apertures formed in a top portion thereof, such that said terra chamber is communicatable to said outside of said aqua chamber.

* * * * *